Aug. 24, 1948.   W. A. RAY   2,447,668
SAFETY CUTOFF SYSTEM FOR FUEL BURNERS
Filed Jan. 2, 1946   4 Sheets-Sheet 3
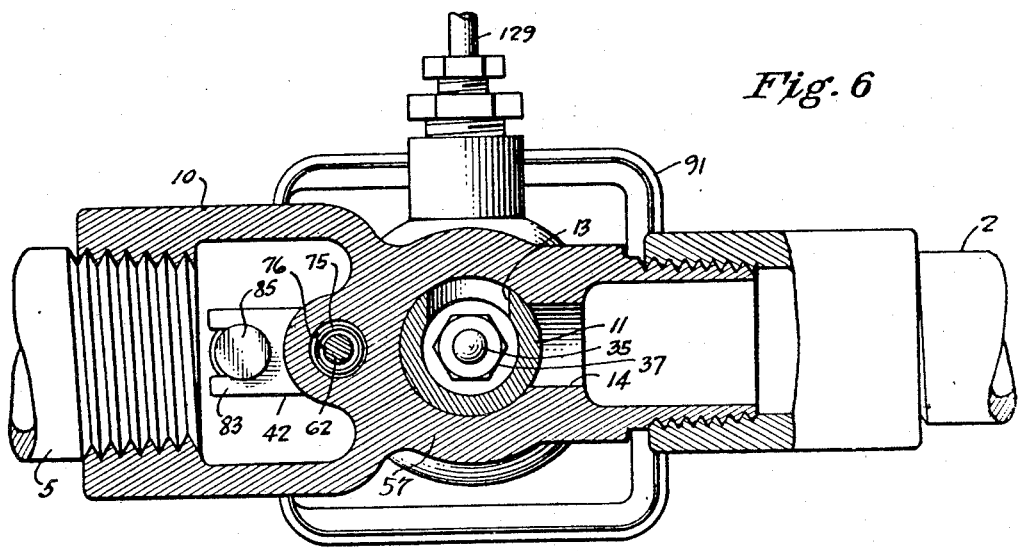
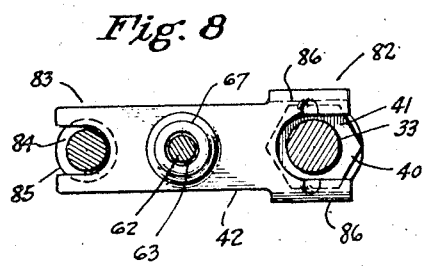
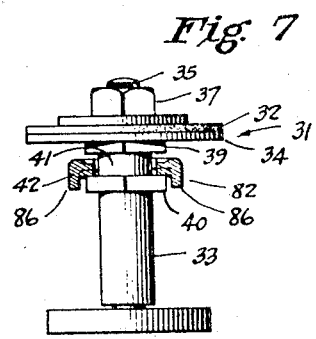
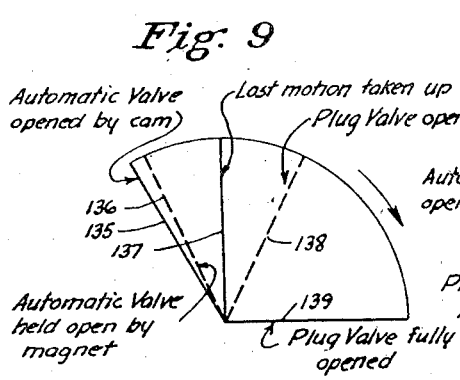
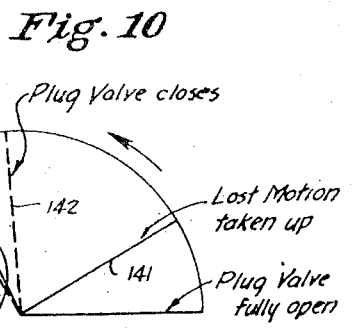
INVENTOR
William A. Ray
BY John Flam
ATTORNEY Aug. 24, 1948. W. A. RAY 2,447,668
SAFETY CUTOFF SYSTEM FOR FUEL BURNERS
Filed Jan. 2, 1946 4 Sheets-Sheet 4

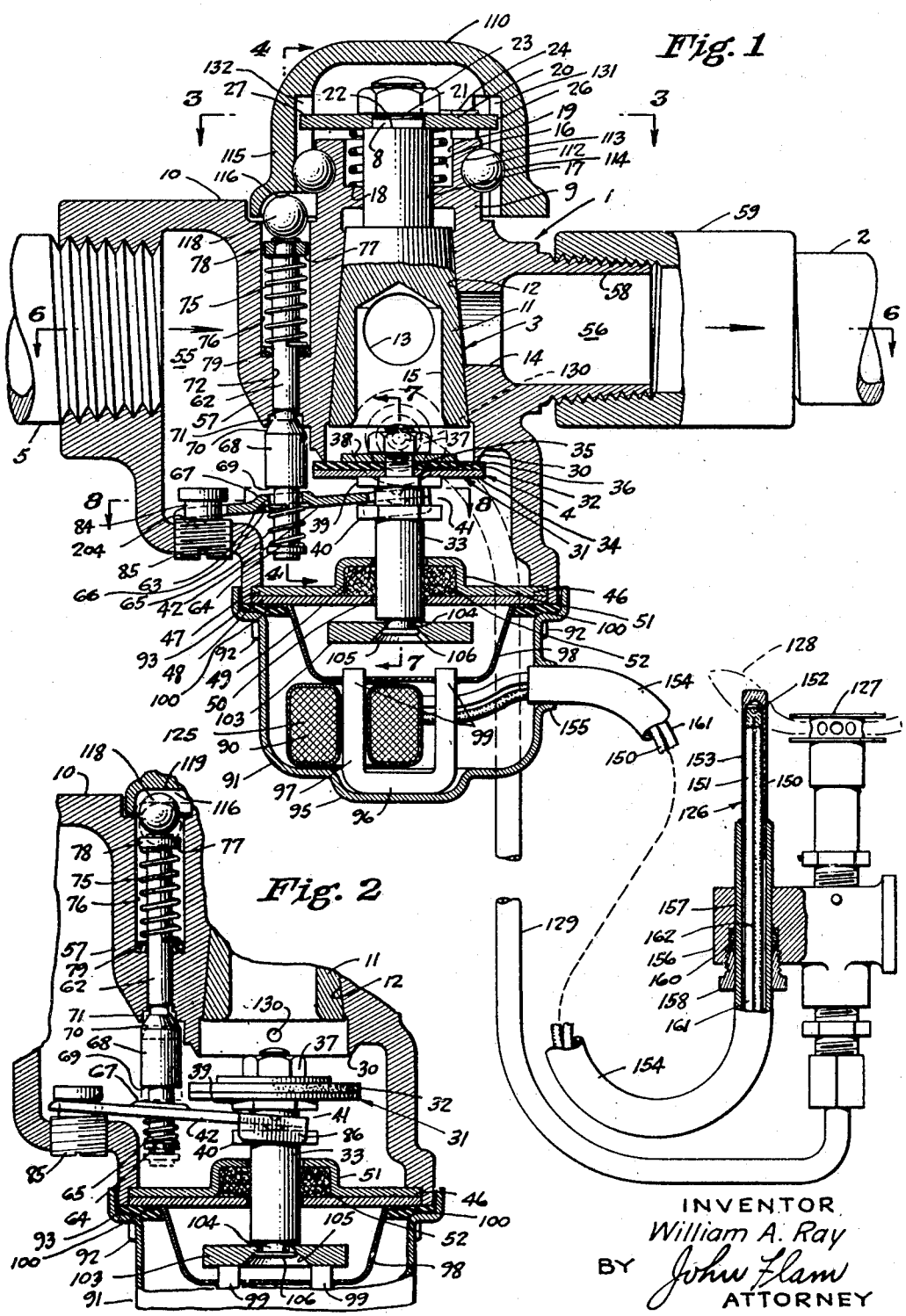

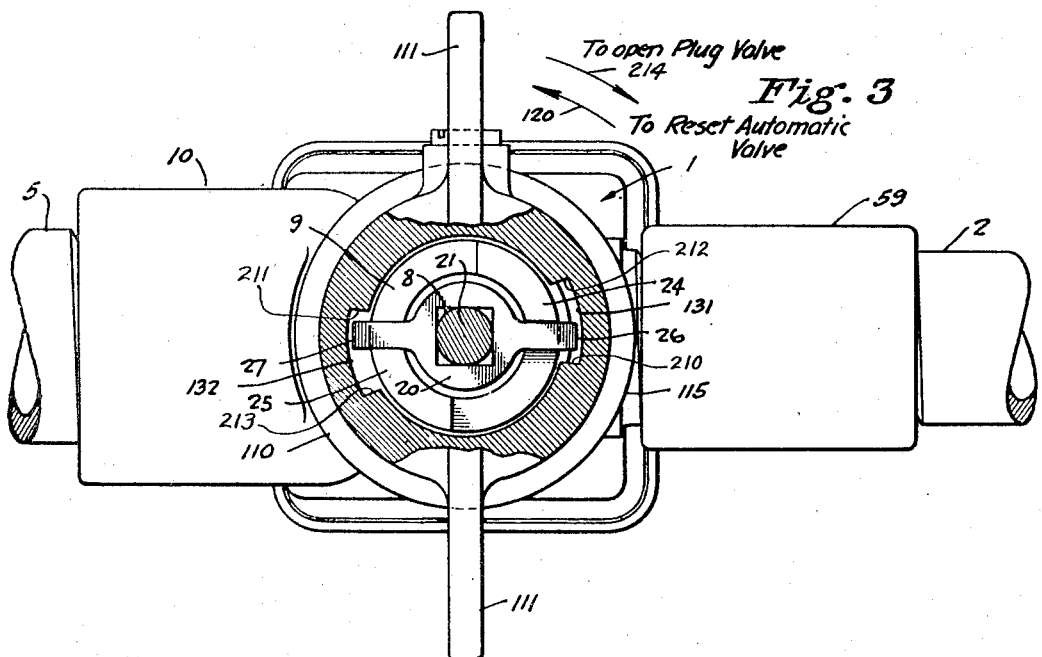
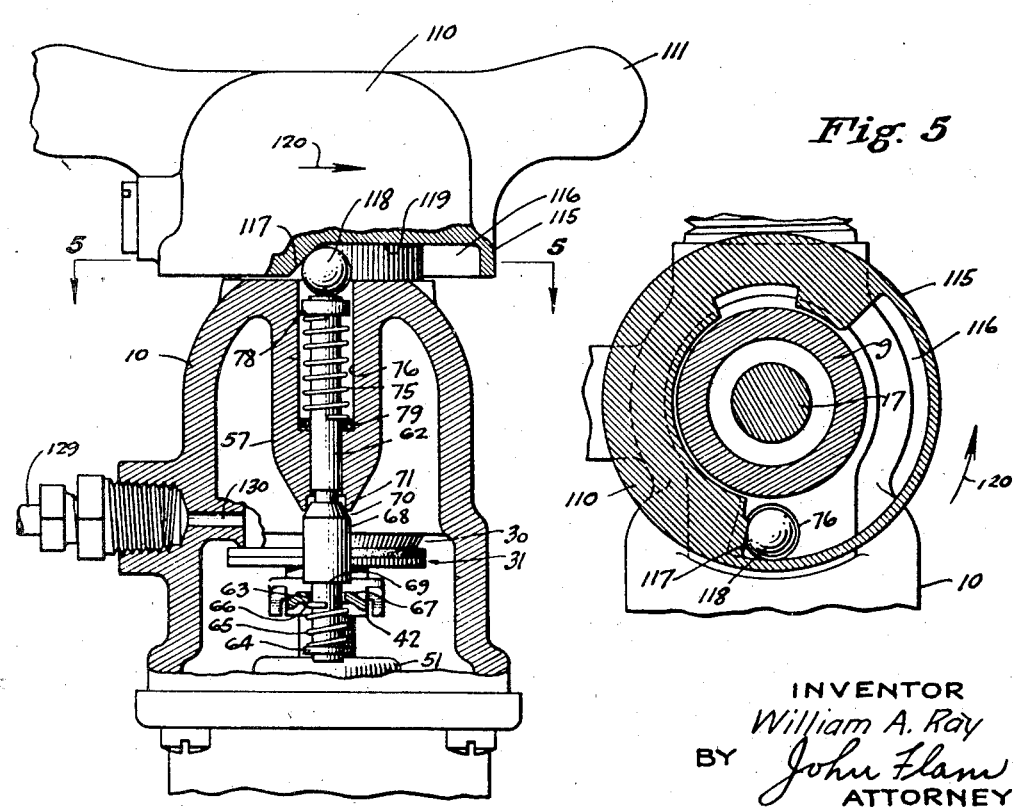

INVENTOR
William A. Ray
BY John Flam
ATTORNEY

Patented Aug. 24, 1948

2,447,668

UNITED STATES PATENT OFFICE 2,447,668

SAFETY CUTOFF SYSTEM FOR FUEL BURNERS

William A. Ray, North Hollywood, Calif.

Application January 2, 1946, Serial No. 638,659

4 Claims. (Cl. 158—117.1)

This invention relates to a furnace control system, and particularly to such a system employing a safety valve, incorporating a thermocouple and a reset mechanism, as well as a master valve responsive, for example, to room temperature for controlling the furnace. Such a system may include a single unit furnace, employing one burner and one safety valve, or it may comprise a multiple unit furnace, employing a plurality of burners and safety valves, one for each burner, controlled by a common master valve.

This application is a division of an application filed in the name of William A. Ray, on February 4, 1941, under Serial No. 377,274 and entitled "Reset valve and control therefor," now Patent No. 2,403,611, granted July 9, 1946.

A safety valve of this type, commonly includes an automatic shut-off valve arranged to insure against flow of fuel to the main burner, as well as to the pilot burner, while the pilot burner is unlighted and which is arranged to be maintained open by an electromagnet energized by a thermocouple in the pilot flame and hence is open only as long as the pilot burner remains lighted. Additionally, such a valve includes a manually operable main valve to control optionally the fuel flow to the main burner as long as the pilot burner is lighted, and reset means are provided so that it is necessary to close the main valve before the shut-off valve can be opened and supply fuel to the pilot burner. In this way a dangerous accumulation of fuel is prevented in the event if failure of the pilot burner. Further, since the main valve must be closed before the shut-off valve can be opened, injury to the user through ignition of a large volume of gas when lighting the pilot burner, is guarded against.

Thus, as long as the main valve and the shut-off valve are open the master valve has control of the system. If it desired to render the furnace inactive independently of the master valve, the main valve or valves are closed. Thus, in a system employing a plurality of furnaces, each equipped with a safety valve, one or more furnaces may be shut down as required. Further, in the event of pilot flame failure, fuel flow is prevented only to the furnace associated with pilot flame that has failed, the operation of the remaining furnaces continuing in accordance with the dictates of the master valve.

It is an object of this invention to provide an improved system of this type.

It is another object of this invention to provide a control system for a furnace having one or more units, said system having means for controlling the furnace and means insuring against fuel flow to any unit when it is desired to light the pilot burner associated therewith.

It is another object of this invention to provide a control system for a furnace having one or more units, said system having means for controlling the furnace, and of means for preventing fuel flow to any of the units, responsive to failure of the pilot flame associated therewith.

It is another object of this invention to provide a control system for a furnace having one or more units, said system having means for controlling the furnace, means for optionally rendering any of the furnace units inactive, as well as for preventing fuel flow to any of the units responsive to failure of the pilot flame associated therewith.

It is another object of this invention to provide a control system for a furnace having one or more units, employing a master valve for controlling the furnace and a reset valve for each unit, said reset valve serving optionally to render the associated furnace unit inactive independently of the master valve as well as to prevent fuel flow to the unit when the pilot flame associated therewith is extinguished.

It is another object of this invention to provide a valve for use in such a system, of improved and simplified construction.

It is another object of this invention to provide such a valve incorporating novel means for controlling fuel flow to the pilot burner.

It is another object of this invention to provide a reset valve adapted for use in connection with controlling the individual burners of a furnace having one or more units.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is a view, mainly in section, of the reset valve, including an improved thermocouple for controlling the valve;

Fig. 2 is a similar view of a fragment of Fig. 1 showing another position of the valve;

Fig. 3 is a top plan view of the valve, partly in section, as indicated by the arrows 3—3 in Fig. 1;

Fig. 4 is a section as seen on plane 4—4 of Fig. 1;

Fig. 5 is a section as seen on plane 5—5 of Fig. 4;

Fig. 6 is a section as seen on plane 6—6 of Fig. 1;

Figs. 7 and 8 are detail sections as seen on correspondingly numbered planes of Fig. 1;

Figs. 9 and 10 are diagrams illustrating the operation of the valve;

Figure 13:
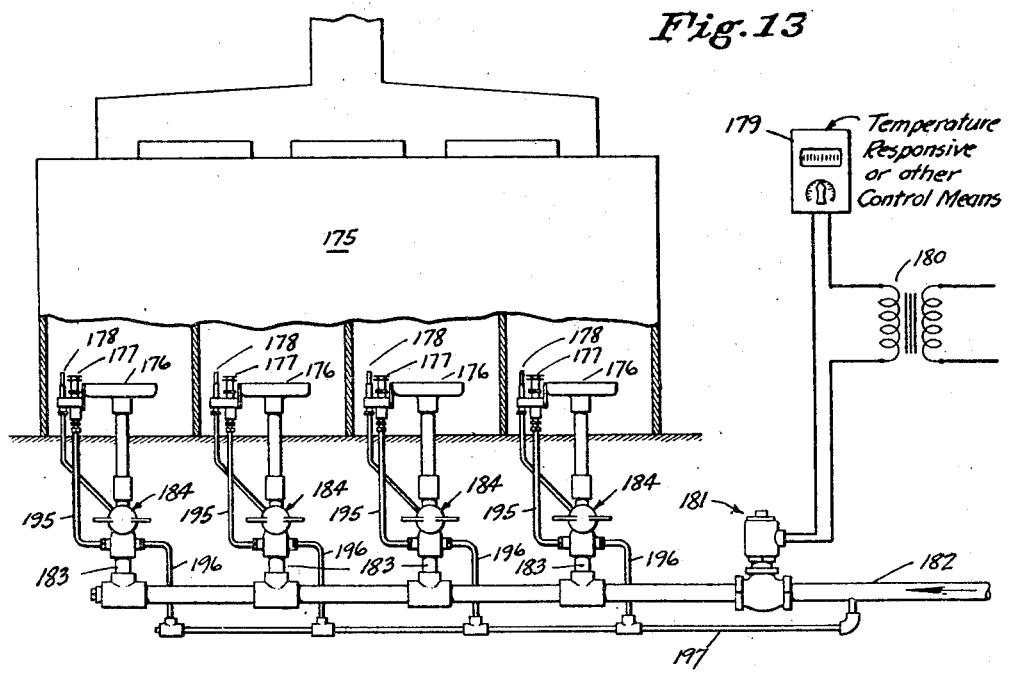
Fig. 13 is a showing in diagrammatic form of a system including a multiple unit furnace controlled by reset valves.

The valve 1 is shown as coupled to a conduit 2 arranged to supply gaseous or liquid fuel to a burner (not shown). The valve structure 1 is a dual valve, including the main gas cock 3 arranged for manual control and the automatic shut-off valve 4. Fuel under pressure is admitted to the valve structure 1 by conduct 5.

It is apparent that when the automatic shut-off valve 4 is closed, as in Fig. 1, no fuel can be delivered through the main cock 3. The valve 4, however, is so arranged that it may be held in its open position. When the valve 4 is open the control of the flow of fuel is effected by the main cock 3.

The valve structure 1 includes a body 10 for accommodating the main cock 3, and the automatic valve 4, together with the means for opening the latter, thus providing a simple and compact structure with no exposed moving parts. The main cock 3 comprises a rotatable hollow tapered plug 11, seated in a cooperating conical seat 12 formed in body 10. In the position of Fig. 1, the plug 11 is in closed position, the discharge opening 13 of the plug being out of alinement with the outlet port 14 in body 10. The inlet to the plug is formed by the axial more 15, which is open at the bottom of the plug.

The plug 11 is urged to its seat 12 for substantially fluid tight operation, as by the aid of a compression spring 16. This spring is disposed around a post 17 connected to and projecting upwardly from the upper end of plug 11, the lower end of the spring seating on the bottom 18 of a counterbore 19 formed in the cylindrical boss 9 of body 10. The upper end of spring 16 abuts a stop plate 20, firmly secured to post 17. Thus, post 17 has its upper end portion 21 of reduced diameter with a square base portion 8 forming a shoulder 22 for the accommodation of plate 20 and threaded for the reception of a nut 23. Nut 23 serves to clamp stop plate 20 against the shoulder 22. The force exerted by spring 16 against stop plate 20 is such as to urge plug 11 firmly to its seat, so that a substantial force is required to rotate the plug from closed to open position, or vice versa, and to seal the plug.

The angular movement of plug 11 is limited to 90° as shown most clearly in Figs. 1 and 3. Thus, the boss 9 on body 10 has upwardly extending lugs 24 and 25, forming abutments for the oppositely extending arms 26 and 27 on plate 20. The means for rotating plug 11 will be described later.

Within the body 10 and surrounding the lower end of tapered seat 12, a raised annular valve seat 30 is formed, this seat being concentric with the tapered plug seat 12. A closure structure 31 is provided to cooperate with the raised seat 30. Thus structure 31 includes a valve closure member 32 adapted to cooperate with the valve seat 30 and made of some suitable yielding material, such as "neoprene." Closure member 32 is supported on a stem 33 by means of a relatively stiff backing plate 34, which may be of metal. The upper portion 35 of stem 33 is of reduced diameter forming a shoulder 36 for supporting plate 34 and threaded for the reception of a nut 37. Nut 37 serves to clamp plate 34 on shoulder 36, a large diameter washer 38 of metal or other stiff material being interposed between the nut 37 and the "neoprene" closure member 32.

Stem 33 has axially spaced hexagonal portions, 39 and 40, of larger size immediately below the threaded end portion 35 and defining a groove 41 for the reception of an operating arm or lever 42. The lower end of body 10 is closed by a member 46 formed of upper and lower plates 47 and 48, each provided with an opening 49 and 50 to accommodate stem 33. The upper plate 47 has a circular upset portion or hollow boss 51 for the reception of packing 52. This packing may be felt or other suitable material. This boss 51 also serves to space openings 49, 50 apart so as to better serve as a guide for stem 33. The arrangement is such that the valve closure structure 31 is guided axially with respect to seat 30 by stem 33 and may be moved toward or away from seat 30 by lever 42.

Body 10 is divided into an inlet chamber 55 and an outlet chamber 56 by that portion 57 of the body carrying valve seats 12 and 30. This portion 57 as shown most clearly in Fig. 6, is of general cylindrical structure. Fuel is admitted to inlet chamber 55 by conduit 5 which is secured in body 10 by conventional pipe threads. Fuel is conducted from outlet chamber 56 by means of conduit 2. As shown, body 10 is provided with an exteriorly threaded extension 58, to which conduit 2 is secured by a pipe coupling 59. Obviously, if valve closure 31 is seated communication between chambers 55 and 56 is stopped. If closure 31 is unseated, communication between these chambers may be controlled by rotating plug 11 from the position shown to that in which ports 13 and 14 are in communication, or vice versa.

The mechanism for unsealing closure 31 will now be described. Slidably supported in body portion 57 for movement parallel with the axis of plug 11 is a push rod 62, the lower portion of which extends through an opening 63 in lever 42 (Figs. 1 and 8). The lower end of rod 62 is provided with a thin nut or other means forming a shoulder 64 thereon, a compression spring 65 being confined between this shoulder and the under side of lever 42. A circular depression 66 is formed in the lever to accommodate and guide spring 65. This depression 66 is formed by pressing the material of lever 42 upwardly to form boss 67. Above lever 42, rod 62 is provided with an enlarged portion 68, forming a shoulder 69 immediately above boss 67. The upper end 70 of enlarged portion 68 is coned, cooperating with a counterbored portion 71 of the bore 72 carrying push rod 62, to form a seal when the rod 62 is in its upper or normal position. This serves to prevent escape of fuel from chamber 55 along rod 62. Encircling the upper portion of rod 62 is a compression spring 75, accommodated in a counterbore 76 of bore 72. This spring is confined between a shoulder 77 formed on rod 62 as by a washer 78 and the bottom of counterbore 76. A packing washer 79 of suitable material such as felt is interposed between the end of spring 75 and the bottom of counterbore 76 to prevent escape of fuel between rod 62 and its supporting bore 72, when rod 62 is depressed.

As clearly shown in Figs. 7 and 8, lever 42 is provided with a forked end 82, the forks of which enter into groove 41 on stem 33. The opposite end 83 is also forked so as to be accommodated in a groove 84 formed in a threaded plug 85 supported in a wall of body 10. The arrangement is such that depression of rod 62 against the force of spring 75 will cause shoulder 69 to contact boss 67, swinging lever 42 downwardly about the shoulder 204 of plug 85 as a fulcrum, and moving valve structure 31 downwardly and away from seat 30.

The position of the fulcrum for lever 42 may be altered to secure proper operation of the valve 31, by adjusting the threaded plug 85 in the body. After adjustment it is sweated in place, to hold it in adjusted position as well as prevent leakage.

It is desirable to prevent rotation of member 32 with respect to seat 30. In this way, any tendency for the member 32 to wear by friction on the seat 30 is eliminated. For preventing this rotation the forked end 82 of lever 42 has downturned lugs or cheeks 86 (Fig. 7 and 8) arranged to engage opposite faces of the hexagonal portion 40 of stem 33.

Provisions are made for maintaining valve 31 open against the force of spring 75 as well as against the pressure of the fluid in chamber 55. For this purpose use is made of an electromagnet 90 supported in a housing 91. This housing 91 which may be of light sheet metal is secured over the lower end of body 10 in any convenient manner as by screws 92. A gasket 93 is interposed between the housing 91 and the body 10 to prevent escape of fuel. Housing 91 and gasket 93 cooperate to hold closure member 46 in place on body 10. Housing 91 has a depression 95 for receiveing the horizontal portion 96 of the U-shaped core 97 of electromagnet 90. This serves to position the core 97 along the axis of the valve structure. For accurately positioning core 97 transversely of the valve structure, use is made of a light sheet metal stamping 98, or similar member formed in any other desired manner having openings to receive the legs 99 or core 97. Member 98 is secured in position by having outturned lugs 100 engaged under gasket 93. A substantially complete enclosure, separate from the valve passages, is thus secured for the electromagnet core and its coil.

Cooperating with electro-magnet 90 is an armature 103 of disc form, carried by the lower end of stem 33. Stem 33 has a short neck 104 of reduced diameter at its lower end. Armature 103 has a countersunk hole 105 for the reception of neck 104. This neck is riveted over as indicated at 106, to loosely hold armature 103 on stem 33. Armature 103 is thus free to rock on stem 33, and accordingly is free to accurately accommodate itself to the faces of poles 99, without the need of careful alinement of magnet core 97 with respect to the axis of stem 33. This is an important feature since it enables a minute magnetic force exerted by magnet 90 to retain valve closure 31 in open position, when the closure has once been moved downwardly so as to bring armature 103 into contact with magnet poles 99.

The means for opening the safety valve 4 will now be described. A cap 110 having oppositely extending wings 111 (Figs. 3 and 4) for convenience in operating is rotatably mounted on the upper end of body 10. The cap is radially as well as axially supported on the exterior of cylindrical boss 9 as by a ball bearing arranged in a conventional manner and including balls 112, inner race 113 on boss 9 and outer race 114 in a skirt-like portion 115. This skirt 115 has an arcuate space 116 (Figs. 4 and 5), formed therein, terminating in an inclined or cam surface 117. Supported on stem 62 within bore 76 is a ball 118, the parts being so proportioned that in normal position, with the stem or rod 62 in its uppermost position, ball 118 extends a substantial distance into space 116, but clears the top surface 119 of this space by a suitable distance. Thus, a movement of cap 110 in the direction of arrow 120 (Figs. 4 and 5) will cause cam surface 117 to contact ball 118 and force it downwardly, within bore 76. The bore serves to prevent the ball moving laterally. This downward movement of ball 118 forces push rod 62 downwardly against the pressure of spring 75 and causes shoulder 69 to engage boss 67 on lever 42, swinging lever 42 downwardly about a point on the surfaces forming groove 84 in plug 85, and lowering valve 31 from seat 30. Means to prevent cap 110 from turning so far as to force ball 118 entirely off cam 117 are provided and will be described shortly. Hence, when the turning force on cap 110 is released, spring 75 forces rod 62 together with ball 118 upwardly until the conical closure 70 in rod 62 engages seat 71. This upward movement of ball 118 causes cap 110 to move in the direction opposite to that indicated by arrow 120. It will be noted that cap 110, plug 11 and valve closure structure 31 with its seat 30 are disposed in coaxial relationship, thus making a very compact structure.

The parts are so proportioned that movement of cap 110 in the direction of arrow 120 to the limit provided, will urge the valve structure downwardly a sufficient distance to bring armature 103 into contact with the faces of poles 99 of magnet 90. If magnet 90 is energized, upon release of cap 110, rod 62 will be moved upwardly by spring 75 as just described, but valve 31 will be retained in its lower position by magnet 90; spring 65 is thereby compressed and has insufficient strength to overcome the magnetic force of magnet 90 upon armature 103. All parts will then be as shown in Fig. 2. If, however, magnet 90 is not energized, valve 31 will move upwardly to closed position along with rod 62 by virtue of the force of spring 75. Similarly if at any subsequent time magnet 90 is deenergized, valve 31 will immediately be closed by spring 65.

Electro-magnet 90 is arranged to be energized by electric current generated by a thermocouple generator 126 (Fig. 1) supported by the aid of a pilot burner structure 127 so as to be heated by the flame 128 thereof.

The pilot burner 127 may be supplied with fuel as through a pipe 129, connected to a port 130 leading into the valve body 10 just above seat 30 (see Figs. 2 and 4). Accordingly when the automatic shut-off valve 31 is closed or seated the passage of fuel to pilot burner 127 is interrupted. The arrangement is such that when pilot flame 128 is extinguished, electro-magnet 90 releases armature 103, and spring 65 assisted by the flow of the fuel past seat 30 moves valve 31 to seat 30, stopping the flow of fuel between inlet and outlet chambers 55 and 56.

It is essential that the passage of fuel to the main burner be prevented during the operation of lighting the pilot burner. Accordingly the valve structure is arranged so that the main cock 3 must be in closed position before the automatic shut-off valve 4 can be opened or reset. For this purpose, cap 110 is arranged to operate plug 11 of cock 3 through a lost motion connection, and it is during the lost motion that the safety valve is operated. This is accomplished by the mechanism now to be described.

Rotation of cap 110 is caused to exert a turning force upon plug 11, by operation upon the arms 26 and 27 attached to the plug. Thus, referring to Figs. 1 and 3, the outer ends of arms 26 and 27 are accommodated in arcuate slots 131 and 132 formed in cap 110. With the parts as shown, port 13 of plug 11 is at 90° from port 14 and further movement of plug 11 in a counterclockwise direction is prevented by the engagement of arms 26 and 27 with stationary stops 24 and 25 respectively, that are carried by the body 10. However, further movement in a counterclockwise direction of cap 110 as shown by arrow 120, is possible due to slots 131 and 132, this movement being restricted to an amount necessary to depress rod 62 so as to bring valve 31 downward until armature 103 engages magnet 90. The angular extent of this permitted movement corresponds to the angular separation of the arms 26—27 from the nearer ends 210, 211 of slots 131, 132. This movement is not sufficient to permit ball 118 to be forced entirely out of cap 110. Cap 110 may be turned freely in a clockwise direction as shown by arrow 214, until the ends 212, 213 of slots 131 and 132 engage arms 26 and 27 respectively, when further movement of the cap 110 will rotate plug 11. This rotation of plug 11 is limited by arms 26, 27 and stops 24 and 25 to 90° which alines ports 13 and 14.

Figure 9 diagrammatically illustrates the steps incident to resetting the automatic shut-off valve 4 and opening the main cock 3. The several radial lines of this figure correspond to various positions of the plane passing through the axis and wings 111 of cap 110. The cap 110 is first moved counterclockwise as far as possible, which opens the safety valve 4 and corresponds in position to line 135. This provides fuel for the pilot burner 127 which is lighted, passage of fuel to the main burner being still interrupted by plug 11. After a brief interval to allow the thermocouple 126 to become active, cap 110 is turned clockwise. As it reaches the position indicated by broken line 136, the stem 62 is released and moves to the position of Fig. 2. If magnet 90 is energized, the safety valve stays open, as shown. If, however, the magnet 90 is not energized for any reason, such as failure to light the pilot burner, valve 4 will at once close. Continued movement of cap 110 in a clockwise direction will first cause the lost motion between arms 26, 27 and slots 131, 132 to be taken up, as indicated by radial line 137. After this motion is taken up, plug 11 of the main cock 3 will be turned, bringing ports 13 and 14 into communication at about line 138 and into full register at line 139. Obviously, if pilot burner 127 is lighted the main burner will now be lighted. But, if the pilot burner 127 is not lighted or becomes extinguished, the automatic valve 4 remains closed or closes and takes control of the main burner away from cock 3. It will also be obvious that opening or resetting of valve 4 is only possible while the main cock 3 is closed. It is thus possible to light the pilot in perfect safety.

The main burner can be controlled as desired by cock 3 as long as the pilot is burning. Thus, as diagrammatically shown in Fig. 10, with the plug valve fully open, cap 110 is turned counterclockwise, taking up the lost motion between arms 26, 27 and slots 131, 132 as indicated by line 141, and turning plug 11 to bring ports 13 and 14 out of communication as indicated by line 142 and fully closing the plug valve when line 143 is reached. This position corresponds with that of line 136 of Fig. 9 and the plug valve or cock 3 may be turned from the opened position of line 142 to closed position of line 142, or vice versa as desired.

If the pilot flame 128 becomes extinguished, and it is desired to reset the automatic shut-off valve 4, the plug valve is turned counterclockwise through the closed position indicated by line 143 (Fig. 10) to a position indicated by line 144. This corresponds to position 135 of Fig. 9 in which the automatic shut-off valve is opened as described in connection with that figure.

Due to the fact that armature 103 is mechanically moved into contact with poles 99 of magnet 90, it is possible to control the automatic valve 31 with very small electrical power such as one or two milliwatts. This required low power permits the use of a very simple thermocouple 126.

Referring to Fig. 1, it will be seen that the thermocouple structure 126 employs a single hot junction and that the thermocouple elements 150, 151 are joined as by being fused together at their upper ends 152 to form this hot junction. The elements 150 and 151, as well as the fused junction 152 are enclosed in a metal jacket or sheath 153, of suitable material such as stainless steel. Jacket 153 is secured in one end of a tube 154, which may be of copper, for housing the conductors to be later described. The other end of tube 154 is joined to the magnet housing 91 in a gas tight manner, as by being inserted in a boss 155 on housing 91. In this manner, any gas or fuel which may leak past stem 33 into housing 91 is prevented from escaping, since tube 154 and jacket 153 are gas tight.

Tube 154 is supported by the base 156 of pilot burner 127, which base may be in turn supported by the main burner (not shown) in accordance with usual practice. Thus, base 156 has an aperture 157 through which tube 154 extends, snugly fitting therein. The lower portion of aperture 157 is threaded for the reception of a threaded sleeve 158, closely fitting over tube 154. A collar 160 of deformable material tapering from the center toward each end is disposed in the space between sleeve 158 and the end of aperture 157. The end of the aperture 157 as well as of the aperture in sleeve 158 is slightly countersunk to receive the adjacent end of collar 160. As the sleeve 158 is screwed in against collar 160, the ends of the collar are compressed inwardly against tube 154, securely holding it in place.

Conductors 151 and 150 are formed of dissimilar metals or alloys capable of withstanding the temperature to which they will be subjected. Such alloys, for example, are Chromel and Copel respectively. Since Copel is relatively inexpensive, and to simplify the construction of the thermocouple, one of the conductors as for example element 150 is formed of a continuous piece of Copel wire of a suitable gage and appropriately insulated, as by a very thin coating of enamel. This Copel wire 150 extends from junction 152 into housing 91, where it is joined to one lead of coil 125 of electromagnet 90. Since Copel has a resistance not as great as that of Chromel, there is no intolerable power loss through this conductor. The conductors 150 and 151 may be quite tightly engaged in sheath 153. The bare conductors 151 and 161 are thereby grounded to the sheath, but this of course is not effective to cause short circuiting, in view of the thin layer of insulation on the other conductor 150. The other conductor 151 is formed of Chromel, and is relatively short, being joined to a copper conductor 161 as by fusion or welding at junction 162. The Chromel conductor 151 has a thermoelectric characteristic quite similar to that of the copper lead 161. This lead 161 extends through tube 154 and is joined to the other terminal of coil 125. Since the conductor 150 is insulated for its entire length, the conductor 151, its associated lead 161 and the cold junction 162 can be left without insulation.

Due to the small mass of the conductors forming the thermocouple structure, there is little delay, after the pilot flame 128 is extinguished, in equalizing the temperatures, and the generation of power stopped, resulting in a rapid closure of the safety valve.

Furthermore, the temperature differential from the hot junction 152 to the cold junction formed at the end of the conductor 150 where it joins the electro-magnet is quite large, and there is a consequent improvement in the amount of power generated.

The thermocouple structure illustrated herein is described and claimed in an application filed September 25, 1943, in the name of William A. Ray, bearing Serial No. 503,791 and entitled: "Thermocouple structure," now becomes Patent No. 2,430,887, granted November 18, 1947.

Figure 11:
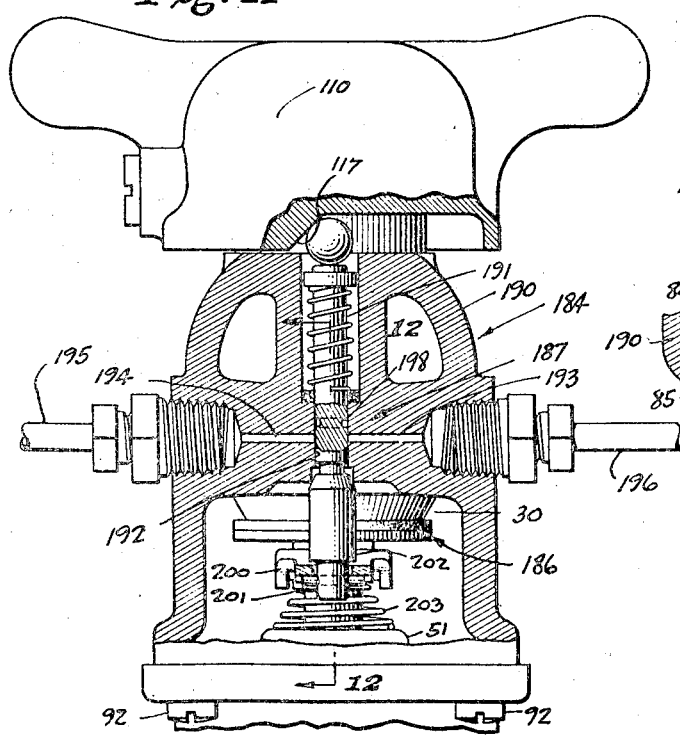
Fig. 11 is a section similar to Fig. 4, but showing a modified form of valve.
Figure 12:
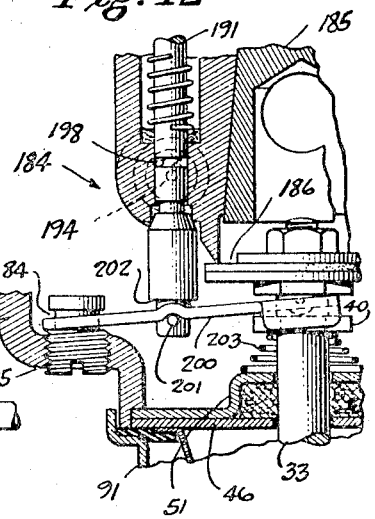
Fig. 12 is a fragmentary section as seen on plane 12—12 of Fig. 11.

When there are individual burner units of a multi-unit furnace to be controlled separately, a slightly modified form of valve is used. The feature wherein the valve which differs from that just described are illustrated in Figs. 11 and 12, while Fig. 13 illustrates diagrammatically a multi-unit furnace system, in which the valve is incorporated.

The furnace is generally indicated by 175, and as shown includes four substantially identical units each heated by a burner 176, having a pilot burner 177, serving to heat a controlling thermocouple 178. It is to be understood that the furnace 175 is used for heating a single space, such as a large auditorium, and is controlled as a unit in any preferred manner, as for example by a thermostat shown diagrammatically at 179, or by a time or manual switch. A source of current, such as a step down transformer is indicated at 180, by means of which switch 179 operates an electromagnetically actuated master valve 181. Valve 181 controls the passage of fuel from a suitable source (not shown) through a conduit 182 having branches 183 leading respectively to each of burners 176. Each branch 183 has a reset valve 184 interposed therein, including a main cock 185 (Fig. 12) and an automatic shut-off valve closure means 186 which operates to control the passage of fuel to the associated burner in exactly the same manner as cock 3 and shut-off valve 4 of valve structure 1, in the first described form of the invention. The valves 184 enable one or more units of the furnace 175 to be rendered inactive, thus improving the adaptability and flexibility of the system to different operating conditions.

It is obviously essential that the pilot lights 177 be supplied with fuel even when the master valve 181 has been closed by switch 179. Accordingly, the supply of fuel for the pilot burners is taken out from pipe 182 at some point between valve 181 and the source of supply, as via connections 197, 196. Thus, the fuel for each pilot 177 is supplied independently of the supply of fuel in branch pipes 183; and arangements are made whereby the fuel supply to each of the pilots 177 is controllable independently of the other pilots.

For this reason, the reset valves 184 each have supplemental valve means generally indicated by 187 (Fig. 11) for controlling the fuel supply for the associated pilot burner 177, port 130 and the connection 129 therefrom being omitted.

Referring to Figs. 11 and 12, valve 184 has a body 190 similar to body 10 of the first form of valve described, within which the plug cock 185 is arranged to be rotated by the winged cap 110, all as before. Push rod or stem 191 is actuated to unseat the automatic shut-off valve 186 by the cam surface 117 in the cap. In this form, the push rod 191 additionally functions as a valve control for the pilot 177. Thus bore 192 in which the rod 191 slides is intersected by alined ports 193 and 194, one of which, for example 194 is connected to the associated pilot burner 177 by a conduit 195. The other port, 193, is connected to the fuel supply line 182 by conduit 196, 197. Push rod 191 is encircled by an annular groove 198 which is adapted to establish communication between ports 193 and 194 only when the push rod 191 is depressed to unseat valve 186. For this reason it is necessary that rod 191 be maintained in its lower position as long as valve 186 is open. Thus an operating lever 200 similar to lever 42 is provided for operatively connecting rod 191 with valve 186. In this case, however, push rod 191 is held in its lower position when valve 186 is maintained open (as by the previously described electromagnetic means 90), by a pin 201, which confines lever 200 against a shoulder 202 on rod 191, suitable clearance being provided. A compression spring 203 is confined between shoulder 40 on valve stem 33 and boss 51 on closure member 46, to assist in urging valve 186 to its seat 30 when released by magnet 90.

When valve 186 is to be reset, cap 110 is rotated to close the valve 185. The stem 191 is depressed by the cam surface 117; valve 187 is opened through the channel 198, and allows fuel to pass to pilot burner 177. After the burner is lighted, thermocouple 178 is energized and holds the automatic valve 186 as well as valve 187 open. Cock 185 may then be utilized to control burner 176, subject however to the master valve 181. If the pilot flame is extinguished, the automatic valve 186 as well as valve 187 both close; thus no fuel can pass to that unit of the furnace 175 under consideration, nor to its pilot. This is particularly important in using a fuel which is heavier than air, for example butane, since if such fuel is allowed to escape through the extinguished pilot burner, it gathers in the low areas in and about the furnace, and forms a dangerous explosive mixture.

It is not necessary to employ a multiple unit furnace as shown at 175 in Fig. 13, to realize the advantages of the system. The furnace may have a greater or a lesser number of units than shown. Thus, a single unit furnace may be provided, employing a single burner 176 controlled by a rest valve 184, and a master valve 181. Such an arrangement makes it possible to extinguish the burner 176 independently of the master valve 181, as well as ensuring against danger upon pilot flame failure. It will be obvious that the fuel supply to the pilot in a single unit furnace must be independent of the master valve 181, as in the multiple furnace arrangement.

The inventor claims:

1. In a fuel supply system having a main burner a main fuel valve, a pilot burner, a shut-off valve for controlling the passage of fuel to the main burner, and means operating in response to the existence of a pilot flame to maintain the shut-off valve open, the shut-off valve when closed preventing passage of fuel through the main valve, a conduit for supplying fuel to a pilot burner, and a reset mechanism for temporarily opening the shut-off valve: the combination therewith of means forming a supplemental valve for controlling the passage of fuel through said conduit, and operated by said reset mechanism, and a master valve for controlling the passage of fuel to said shut-off valve, said conduit being supplied with fuel independently of said master valve.

2. In a fuel supply system for a furnace having at least one unit including a main burner and a pilot burner, a main fuel valve as well as a shut-off valve for controlling the passage of fuel to said main burner, and means operating in response to the existence of a pilot flame to hold the shut-off valve open, the shut-off valve when closed preventing the passage of fuel through the main valve, a master valve for controlling the passage of fuel to said shut-off valve, means to supply fuel to said pilot burner irrespective of the operations of the master valve, and a supplemental valve operatively associated with the shut-off valve to prevent passage of fuel to the pilot burner upon closure of said shut-off valve.

3. In a fuel supply system for a multiple unit furnace, each unit having a main burner and a pilot burner; a manually controllable valve for each main burner; valve means for each pilot burner; a shut-off valve for each main burner, and operating to prevent passage of fuel through the manually controllable valve, and to the pilot burner, in the event of pilot flame failure, means for holding said shut-off valve in open position in response to the presence of a pilot flame, manual reset means for said shut-off valves; a master valve passing fuel to all of said manually controllable valves; condition responsive means for operating the master valve; and separate means for supplying fuel to each of the pilot valve means and independent of the master valve.

4. In a fuel supply system for a multiple unit furnace, each unit having a main burner and a pilot burner: a manually controllable valve for each main burner; a manually reset shut-off valve for each main burner and operating, until reset, to prevent passage of fuel to the main burner, said shut-off valve being biased to closed position; means for manually resetting said shut-off valve; means for holding said shut-off valve in open position in response to the presence of a pilot flame; valve means to pass fuel to the pilot burner; means operated by the manual reset means for operating said valve means to open position; a master valve passing fuel to all of said manually controllable valves; condition responsive means for operating the master valve; and a conduit for supplying fuel to all of said valve means independently of said master valve.

WILLIAM A. RAY.

REFERENCES CITED

The following references are of record in the file of this patent:

UNITED STATES PATENTS

| Number | Name | Date |
|--------|------|------|
| 2,094,284 | TePas | Sept. 28, 1937 |
| 2,127,445 | Hardgrove | Aug. 16, 1938 |
| 2,237,577 | Ray | Apr. 8, 1941 |
| 2,257,024 | Ray | Sept. 23, 1941 |
| 2,271,506 | Mantz | Jan. 27, 1942 |
| 2,318,823 | Wantz | May 11, 1943 |
| 2,353,759 | Ray | July 18, 1944 |